United States Patent [19]
Tamitani

[11] Patent Number: 5,473,378
[45] Date of Patent: Dec. 5, 1995

[54] MOTION COMPENSATING INTER-FRAME PREDICTIVE PICTURE CODING APPARATUS

[75] Inventor: Ichiro Tamitani, Tokyo, Japan

[73] Assignee: NEC Corporation, Tokyo, Japan

[21] Appl. No.: 22,316

[22] Filed: Feb. 25, 1993

[30] Foreign Application Priority Data

Feb. 25, 1992 [JP] Japan ..................... 4-075544

[51] Int. Cl.⁶ .................................................. H04N 7/48
[52] U.S. Cl. ........................................... 348/416; 348/699
[58] Field of Search ............................. 358/136; 348/402, 348/405, 409, 413, 415, 416, 699; H04N 7/133, 7/137

[56] References Cited

U.S. PATENT DOCUMENTS

| | | | |
|---|---|---|---|
| 4,982,285 | 1/1991 | Sugiyama | 358/136 |
| 4,985,768 | 1/1991 | Sugiyama | 358/136 |
| 5,089,889 | 2/1992 | Sugiyama | 358/136 |
| 5,103,307 | 4/1992 | Sugiyama | 358/136 |
| 5,126,841 | 6/1992 | Tanaka et al. | 358/136 |
| 5,144,424 | 9/1992 | Savatier | 358/136 |
| 5,146,325 | 9/1992 | Ng | 358/136 |
| 5,173,772 | 12/1992 | Choi | 358/136 |
| 5,173,773 | 12/1992 | Veda et al. | 358/136 |
| 5,198,901 | 3/1993 | Lynch | 348/413 |
| 5,213,549 | 5/1993 | Ng et al. | 358/136 |
| 5,249,048 | 9/1993 | Sugiyama | 358/136 |

OTHER PUBLICATIONS

Video Information Magazine, Jun. 1991, pp. 83–89.

Primary Examiner—Tommy P. Chin
Assistant Examiner—Richard Lee
Attorney, Agent, or Firm—Foley & Lardner

[57] ABSTRACT

A motion picture coding apparatus for storage medium of a video rate is produced at a low cost. The coding apparatus includes an input picture re-arranging unit for changing the order of frames of input motion pictures, a storage circuit for storing therein decoded pictures of intra-coded and predictive coded pictures, an address generating unit, a motion detector for performing multi-stage motion vector search, a predictive signal generating unit for outputting an interframe predictive signal and a predictive difference signal, a quantizing unit, a variable length coding unit, and locally decoding unit. The predictive signal generating unit simultaneously fetches data read out from the storage circuit to the motion detector for final stage vector search to reduce access to the storage circuit. The locally decoded pictures are placed back in order of reproduced frames to monitor the decoded picture signal by a storage circuit for storing therein decoded pictures of intra-coded and predictive coded pictures of an output of the locally decoding unit and address generating unit.

1 Claim, 14 Drawing Sheets

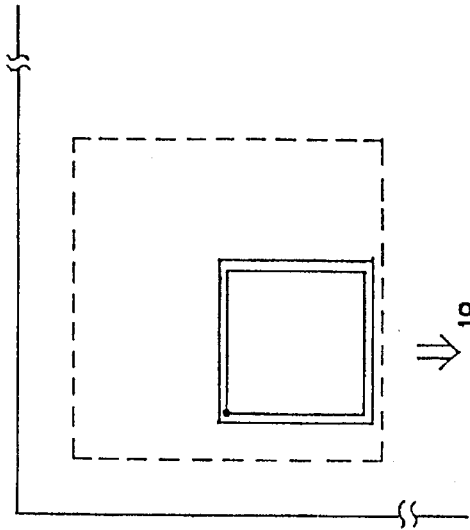
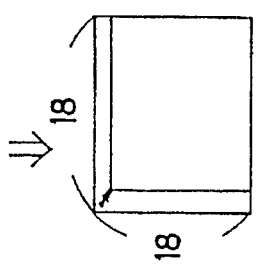
FIG. 6(b)
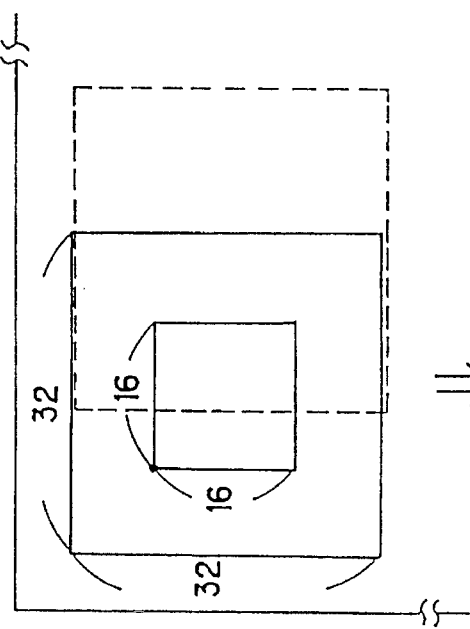
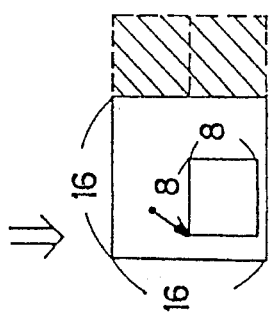
FIG. 6(a)
O : SAMPLE POINT

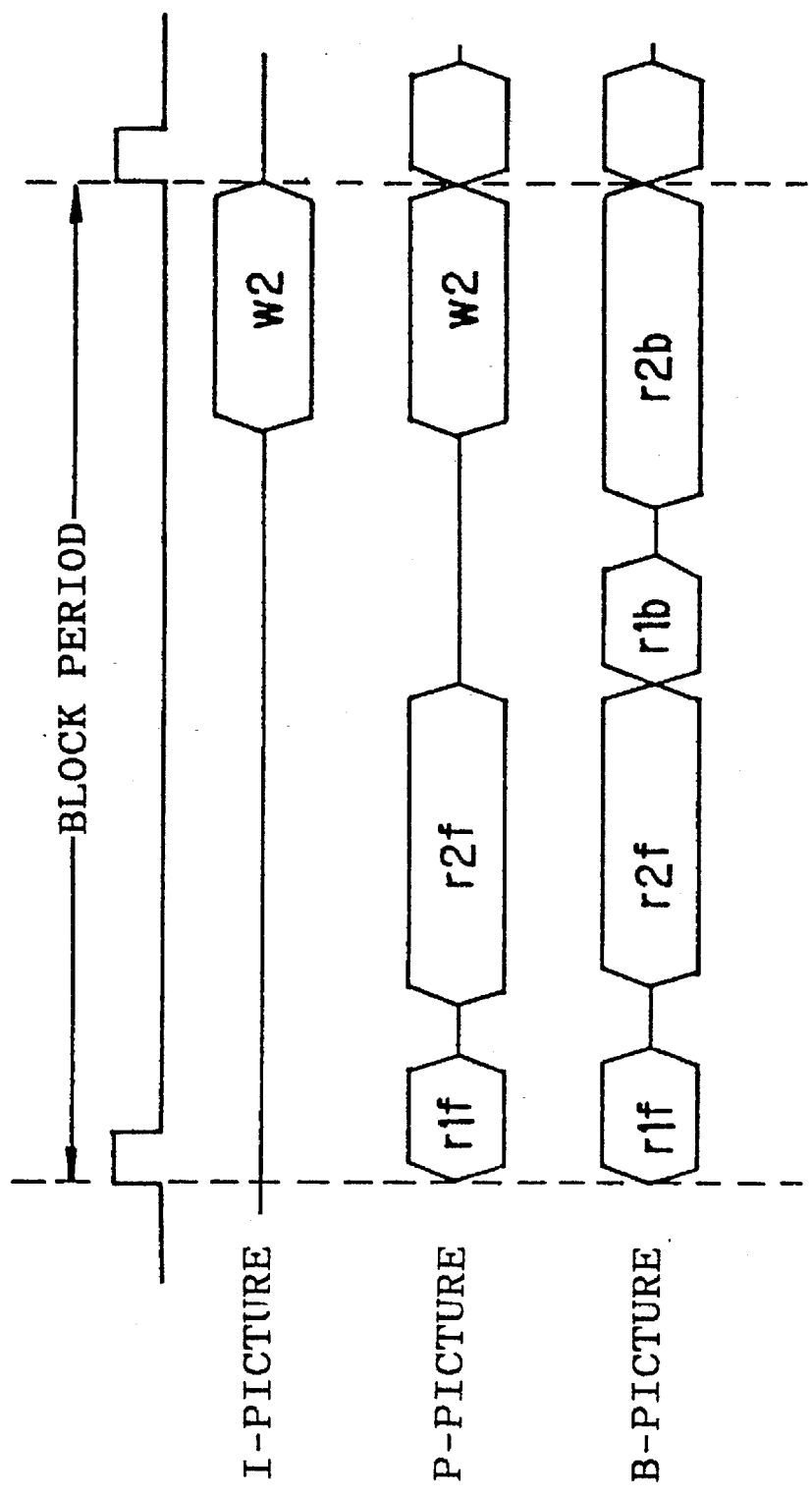

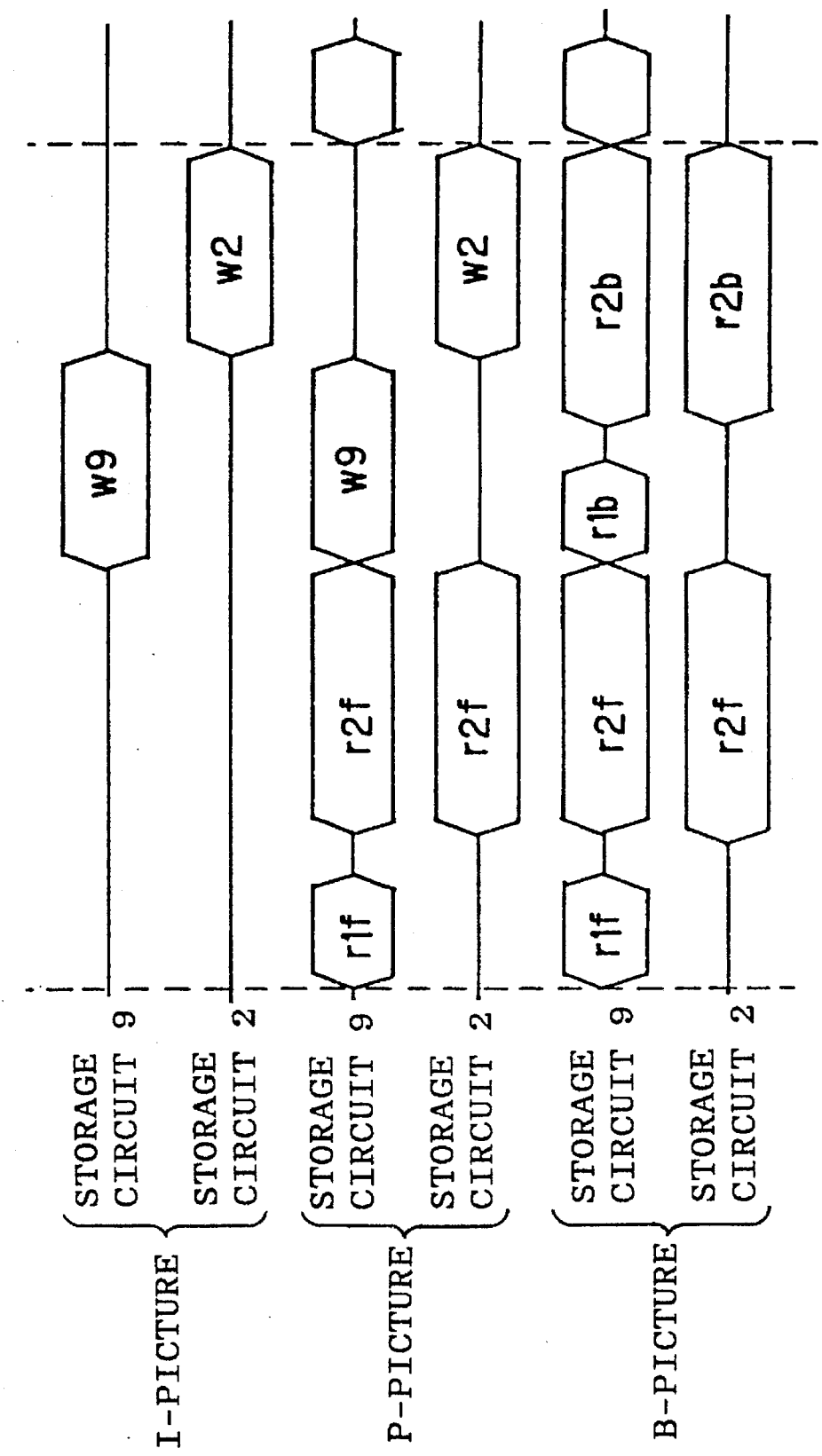

MOTION COMPENSATING INTER-FRAME PREDICTIVE PICTURE CODING APPARATUS

BACKGROUND OF THE INVENTION

1. Field of the Invention

This invention relates to a coding apparatus for coding a motion picture, and more particularly to a video rate compressing and reproducing apparatus for storage media for use with a video mail system, a video tape recorder and so forth.

2. Description of the Related Art

High efficiency coding is applied to a video signal in order to store the video signal into a digital storage medium of a comparatively narrow band such as a compact disk (CD). An investigation of the International Standardization Organization ISO-IEC JTC1/SC2/WG11 (hereinafter referred to as MPEG (Motion Picture Expert Group) as commonly called) is directed to coding systems for media of 1.5 Mbps. An outline of the investigated systems is described, for example, in Journal of Image electronics Society, Vol. 20, No. 4, pp.306–316. According to the document, it is forecast for hybrid coding including a combination of discrete cosine transform (DCT), quantization and variable length coding with motion compensated inter-frame prediction, to be adopted as an international standard. While the basic scheme of the MPEG system is similar to that of the CCITT H.261 document which has been internationally standardized already for the object of an application to motion picture communications, it employs inter-frame prediction in which bidirectionally predictive coding (B-picture) into which backward prediction is included is incorporated in addition to intra-coding (I-picture) and predictive coding (P-picture). Further, enhancement of the coding efficiency is anticipated by raising the accuracy of motion vectors for use for motion compensation up to the accuracy of a half picture element. Since the amount of processing required for coding and the required memory capacity are increased remarkably comparing with those required for realization of an apparatus of the CCITT H261 standard in order to achieve the enhancement of the performance described above, much contrivance is required for realization of the coding apparatus.

One of possible solutions to realization of a picture coding apparatus based on the MPEG system using the current technology is to employ a chip set for image signal processing on the market. A chip set for commercial use is available from Graphics Communication Technologies (GCT). Functions of the individual chips of the chip set are described in Nikkei Electronics, Jul. 25, 1990, pp.209–222. According to the description, the chip set provides individual processing functions such as motion vector detection, DCT, inverse DCT, quantization, inverse quantization, variable length coding and variable length decoding as chips for exclusive use so that a coding apparatus of the CCITT H.261 standard may be constituted from a combination of the processing functions.

However, in order to realize, using the chip set described above, forward/backward inter-frame prediction or vector detection of the half picture element accuracy, which is required newly by the MPEG system, at a video rate, it cannot be avoided to cause a large number of chips to operate in parallel to one another, which gives rise to a problem that the apparatus cost is increased. Another problem resides in that, since the coding chip and the decoding chip are provided separately, if a decoding function is incorporated in a coding apparatus, then this will lead to an increase of the number of processing chips.

In order to allow a coding apparatus for a storage medium of a video rate for use with authoring, a video mail, a digital video tape recorder or the like to be provided at a low cost, first it is necessary to replace processing functions, which cannot be realized efficiently by an existing LSI (large scale integrated circuit), such as bidirectional motion compensation or vector detection of the accuracy of one picture element or less with a VLSI (very large scale integrated circuit) having a higher performance to achieve reduction of the number of parts. In fact, if the VLSI technology in recent years is used, it is not difficult itself to develop a VLSI having a required processing capacity. However, with the present LSI technology, since a frame memory circuit for holding image data cannot be built in a calculation chip, it is a premise that a system configuration employing a memory circuit in addition to a VLSI is employed. In this instance, the required speed of a memory chip or the number of chips to be adopted depend upon the frequency of accessing to the memory circuit. Accordingly, it is important to provide an optimum memory configuration to reduce the overall cost of the system.

Further, in the application system described above, the function of reproducing a motion picture from a bit sequence obtained by coding is essentially required in addition to the real time coding function, and also the function of monitoring a picture being coded is required in order to supervise an influence of compression coding upon the picture quality.

SUMMARY OF THE INVENTION

It is an object of the present invention to provide a coding apparatus for a storage medium of a video rate for use with authoring, a video mail, a digital video tape recorder or the like at a low cost.

It is another object of the present invention to provide a system architecture for a coding apparatus and a real time coding method which is constructed with attention paid to an external memory configuration.

It is a further object of the present invention to provide a coding apparatus into which a reproducing function and a real time monitoring function can be incorporated without preparing a separate decoding apparatus.

In order to attain the objects described above, according to the present invention, there is provided a motion picture coding apparatus for coding picture frames of an input motion picture signal as at least three kinds of inter-frame predictive pictures of an intra-coded picture, a predictive coded picture and a bidirectionally predictive coded picture, which comprises input picture re-arranging means for changing the order of the frames of the input motion pictures based on inter-frame prediction, a first storage circuit for storing therein decoded pictures decoded from intra-coded pictures and predictive coded pictures, first address generating means for controlling inputting and outputting of the first storage circuit, motion detecting means for detecting motion vectors between the decoded pictures stored in the first storage circuit and an output of the input picture re-arranging means, predictive signal generating means for generating an inter-frame predictive signal from the detected motion vectors and the decoded pictures stored in the first storage circuit and for producing and outputting a prediction difference signal representative of a difference of the inter-frame predictive signal from the output of the input picture re-arranging means, quantizing means for quantizing the prediction difference signal, variable length coding means for coding an output of the quantizing means by variable length coding, and locally decoding means for inputting the output of the quantizing means and the inter-frame prediction signal and producing decoded pictures of the intra-coded pictures and predictive coded pictures, the motion detecting means controlling the first address generating means based on the detected motion vectors to realize multi-stage motion vector search. The predictive signal generating means may simultaneously fetch data read out for last stage vector search from the first storage circuit by the motion detecting means.

The motion picture coding apparatus may further comprise a second storage circuit, an intra-coded picture or a predictive coded picture of the output of the input picture frame re-arranging means being stored into the second storage circuit while the motion detecting means detects motion vectors between the input pictures stored in the second storage circuit and the output of the input picture re-arranging means, inputting and outputting of the second storage circuit being controlled by the first address generating means. The prediction signal generating means may simultaneously read out, from the first storage circuit, decoded data at the same address as the input picture data read out for last stage vector search from the second storage circuit by the motion detecting means and use the read out decoded data for generation of prediction.

The motion picture coding apparatus may further comprise a third storage circuit for storing therein the output of the locally decoding means, second address generating means for controlling inputting and outputting of the third storage circuit, and an output port for outputting output data from the third storage circuit or the locally decoding means to the outside, the locally decoding means also generating a decoded picture of a bidirectionally predictive coded picture. A decoded picture of a bidirectionally predictive coded picture obtained from the locally decoding means may be outputted to the output port while a decoded picture of an intra-coded picture or a predictive coded picture is outputted to the output port after it is stored into the third storage circuit so as to arrange locally decoded pictures of the coded pictures back into those in order of reproduced frames and output them.

The motion picture coding apparatus may further comprise variable length decoding means for decoding a variable length code word supplied from the outside by variable length coding, the second address generating means control reading out of predictive picture data from the third storage circuit using a motion vector decoded by the variable length decoding means while the locally decoding means produces a decoded picture from predictive picture data read out from the third storage circuit and the output of the variable length decoding means to realize a reproducing function. A decoded picture of a bidirectionally predictive coded picture obtained from the locally decoding means may be outputted to the output port while a decoded picture of an intra-coded picture or a predictive picture obtained from the locally decoding means is outputted, after it is stored into the third storage means, to the output so as to arrange the decoded pictures back to those in order of reproduced frames and output them.

In the motion picture coding apparatus, in order to smoothly perform inter-frame predictive coding at a video rate including the backward direction, the order of frames of an input video signal is re-arranged prior to coding processing. This is because, in order to effect inter-frame prediction for object pictures for coding from the future, it is necessary to code/decode a frame, which is inputted later in time, precedently. If the input wherein the order of frames has been re-arranged is premised, then coding processing on the real time basis is possible by keeping the time required for coding of each frame within one frame period.

Such a procedure of processing as described above can be surveyed using FIG. 2. Referring to FIG. 2, a frame train $F_i$ ( ..., $F_{-1}$, $F_0$, $F_1$, $F_2$, ... ) of input pictures is shown at an uppermost stage of FIG. 2. One of coding types of intra-coding (I-picture), predictive coding (P-picture) and bidirectionally predictive coding (B-picture) is allocated to each picture frame. The order of frames after the input order is re-arranged in accordance with the allocation is shown at a next lower stage. The order of re-arranged frames is ( ..., $F_0$, $F_{-2}$, $F_{-1}$, $F_3$, $F_1$, $F_2$, $F_6$, ... ), and coding processing is applied in order of the frames. Reference characters FM and FM' denote frame memories having a capacity for two screens of the picture signal and are used for motion vector search and for storage of a locally decoded signal, respectively. The search memory (FM) is used to store therein input pictures corresponding to I- and/or P-pictures to detect motion vectors from a current input frame. For example, when the frame $F_{-2}$ or $F_{-1}$ is to be coded, since the frames $F_{-3}$ and $F_0$ are stored in the search memory FM, they are used for motion vector search. Using the motion vectors thus obtained, locally decoded signals ($F'_{-3}$, $F'_0$) stored in the memory FM' are read out to generate a predictive signal. For example, upon coding of the frame $F_{-2}$ or $F_{-1}$, an inter-frame predictive signal is generated using the locally decoded signal $F'_{-3}$ for forward prediction and using the locally decoded signal $F'_0$ for backward prediction. The frame memories FM and FM' change over, in response to a signal TGL shown at a lowermost stage in FIG. 2, a top address to which the input signal and the locally decoded signal are to be stored, so that two I- and/or P-pictures coded last are stored there. It is to be noted that, as publicly known, a locally decoded signal may be used for detection of motion vectors in place of the input signal. In this instance, since motion vectors may be detected between contents of the frame memory FM' and a current input frame, the frame memory FM can be omitted.

Coding processing in each frame period is performed for small blocks of N picture elements×N lines into which one picture is divided. In the MPEG system, N=16, and a standard image of, for example, 352 picture elements×240 lines is divided into 330 blocks to code it.

For one block, first, motion vectors in the forward and backward directions are detected. In this instance, since motion detection in both directions is necessary and also it is necessary to expand the motion vector search range in accordance with the number of successive B-pictures, the search range becomes more than eight times that of the H.261 standard. Accordingly, if the full search is realized as it is, also the memory access increases remarkably. Therefore, the present invention first adopts a multistage search (the number of stages is hereinafter represented by K) for motion vector detection and then uses only subsampled signals for search at each stage to achieve reduction of the access frequency based on subsampling. However, when vector detection with the accuracy of one picture element or less is premised, since interpolation calculation is necessary, all picture element values within the search range are necessary for vector search at least at the last stage. Meanwhile, subsampling cannot be applied to predictive signal generation since all picture elements are essentially required. Accordingly, in order to further enhance the efficiency in memory access, the present invention employs the method wherein memory access for last stage search and access for predictive signal generation are performed simultaneously. Upon such employment, investigations for a case wherein a locally decoded signal is used for motion vector detection (data stored in the memory FM' of FIG. 2 are used for vector search) and another case wherein an input signal is used (data stored in the memory FM of FIG. 2 are used for vector search) have been made, and accordingly, they will be described one after the other.

First, in the case wherein motion vectors are to be detected from a locally decoded signal, data read out from the memory FM' for search at the Nth stage are fetched simultaneously into a buffer provided in a predictive signal generating section, and after vectors with the accuracy of one picture element or less are settled after completion of search, a predictive signal is produced using the data in the buffer. With the configuration, the number of accessing operations to the frame memory FM' for which subsampling cannot be performed can be reduced from twice to once.

Subsequently, the case wherein motion vectors are detected from an input signal will be investigated. Since vector search is performed for an input signal, a search section and a prediction generating section cannot use the identical data. However, as can be seen from FIG. 2, an input image and a corresponding locally decoded signal can be stored to the same addresses of the search memory (FM) and the locally decoded signal storage memory (FM'). In particular, for reading out of data for predictive signal generation and Kth stage search, both of the search memory and the locally decoded signal storage memory can be accessed at a time by a same address controlling section. Consequently, the memory access for motion vector detection for the forward and backward directions and for generation of a predictive signal is reduced.

Subsequently, a method of outputting a locally decoded signal to the outside in order to allow monitoring of a coded picture on the real time basis will be described. While the order in coding of the locally decoded signal is different from that of the input signal, the original order can be restored by storing two I- and/or P-pictures decoded last once into a memory. The change of order of frames to be displayed is necessary also as a reproducing function. In the present invention, a frame memory FM" is prepared for both of reproduction and monitoring. A (locally) decoded signal is stored into FM" as seen from FIG. 2, and it is placed back into the display order shown at a lower stage and then outputted.

In FIG. 2, an area for storing a B-picture therein is assured in the frame memory FM" so that a B-picture may be stored once therein. Thus, any of I-, P- and B-pictures can be read out while changing it in the same scanning order. However, in the case wherein a frame buffer is prepared at a next stage or the like, such scanning order change is not always required, and accordingly, the B-picture area of frame memory FM" can be omitted and only re-arrangement in order of frames is performed.

Memory access necessary for motion vector detection in one direction and generation of a predictive signal where generally the block size is N×N and the range of search vectors is m in the horizontal direction and n in the vertical direction will be evaluated.

In the search in the present invention, the access frequency at the first stage is $0.25*(N+n)$, and the search frequency (and generation of prediction) at the second stage is $(N+2)^2$. Accordingly, a total access is $1.25N^2+(4+0.25n)N+4$. Since this is an access frequency per block period, it can be seen that, if this is normalized with $N^2$, then it is $1.25+(4+0.25n)*(1/N)+4/N^2$ times that of the original signal rate. As a concrete value, when N=16 and the access permitted for vector search is made twice the original signal rate, search can be performed up to n= 31 or so. This signifies that motion vectors with the accuracy of 0.5 picture elements can be found out within the range of ±16 data. Further, if the access of up to 2.5 times is anticipated, then n=63 (±32), and a motion compensation range sufficient for practical use can be obtained.

For comparison, a case wherein vector search from a locally decoded signal is performed will be described. Here, the case is supposed wherein $N*(N+n)$ data are fetched for each block period for vector search and all of the data are held in the buffer memory to make the access minimum. When normalization with $N^2$ is performed, then $1+n/N$ is obtained. With N=16, the access is twice the original signal rate with n=16, and further with n=32, the access is three times, and with n=64, the access is five times. It can be seen that, comparing with the present method, the expansion of the search range (increase of n) has a great influence upon the entire access.

In this manner, it has been proved that the access required for motion vector search and predictive signal generation in the present invention can realize a practical compensation range of n= 31 to 64 at the signal rate of four to five times that of the original signal even when access required for writing is incorporated.

By the present invention, a coding/decoding apparatus for storage media of a video rate and a coding processing technique wherein memories necessary for coding and decoding are disposed at substantially equal access frequencies are obtained. Consequently, development of a coding apparatus wherein various calculating functions are replaced with a VLSI of a higher performance to achieve reduction of the number of parts is allowed.

Since up to scanning order change can be performed, upon coding processing, in monitoring or decoding processing using a storage circuit, scanning order change at a later stage is unnecessary, and consequently, externally provided circuits can be reduced. Further, if an area for storing all of B-pictures therein is assured in a monitor/reproduction memory, even a still (pause) picture upon reproduction or local decoding of a B-picture can be realized by repetitive reading out of it from the monitor/reproduction memory. Thus, the number of frame memories can be reduced comparing with an alternative configuration wherein a memory for a still image is disposed separately on the outside.

Since the multi-stage system employing subsampling is adopted for realization of a section for motion vector detection and a predictive signal generating section, the buffer memory size can be reduced comparing with the full search method, and this fact allows it suitable to obtain of a VLSI. Further, since only one address generating circuit must be provided, the number of address output pins for access to an external memory can be saved. As regards inter-frame prediction, since detection of a motion vector from an input signal can be realized only by addition of a memory chip (or by increase of the speed of the memory chip), a system suitable for an adopted system can be built up.

Variable length coding and decoding processing, and generation of a monitoring address and generation of a reproduction address are functions which are used only upon coding and decoding, respectively. Accordingly, it becomes possible to adopt a processor form in development of a VLSI and change over functions of a single VLSI by replacement of a program. In this instance, since reproducing and monitoring functions can be realized by addition only of a memory chip when necessary, a system which is suitable for an apparatus configuration can be built up.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 6a and 6b are diagrammatic views illustrating manners of search at first and second stages, respectively, in the coding apparatus of FIG. 1 or 4;

FIGS. 10(a) and 10(b) are diagrams illustrating operation timings of the coding apparatus shown in FIGS. 1 and 4, respectively;

DESCRIPTION OF THE PREFERRED EMBODIMENTS

Figure 1:
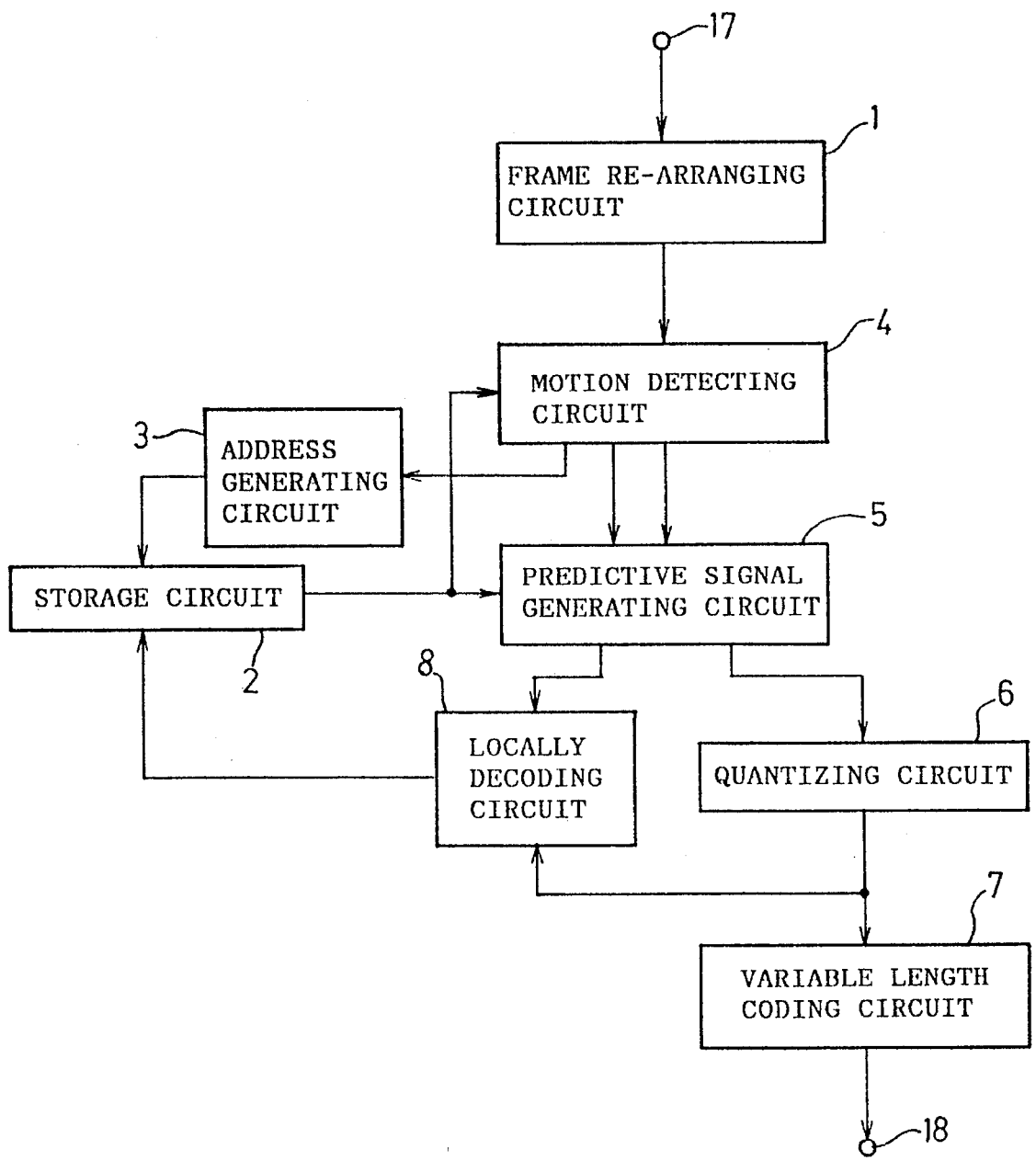
FIG. 1 is a block diagram of a coding apparatus showing a first preferred embodiment of the present invention.

Referring first to FIG. 1, there is shown a motion picture coding apparatus according to a first preferred embodiment of the present invention. The motion picture coding apparatus shown has a picture signal input port 17 and a bit sequence input/output port 18 and includes an input picture re-arranging circuit 1 for receiving input motion pictures and changing the order of frames of the input motion pictures based on inter-frame prediction, a storage circuit 2 for storing therein locally decoded pictures of coded I- and P-pictures, an address generating circuit 3, a motion detecting circuit 4, a predictive signal generating circuit 5, a quantizing circuit 6 for performing DCT and quantizing processing, a variable length coding circuit 7, and a locally decoding circuit 8 for performing inverse quantization, inverse DCT and frame addition.

Figure 2:
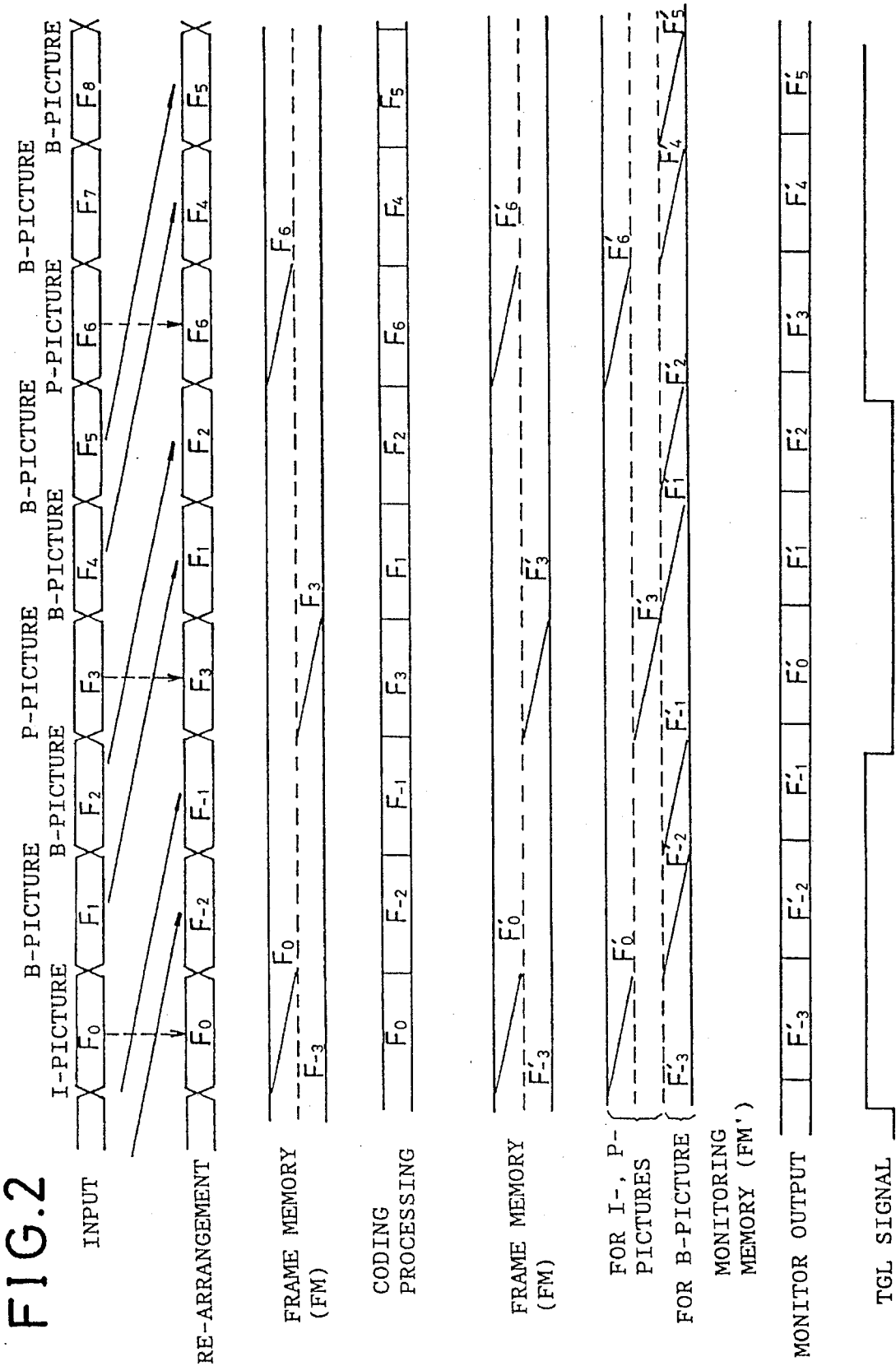
FIG. 2 is a diagrammatic view illustrating operating timings of the coding apparatus shown in FIG. 1.
Figure 3:
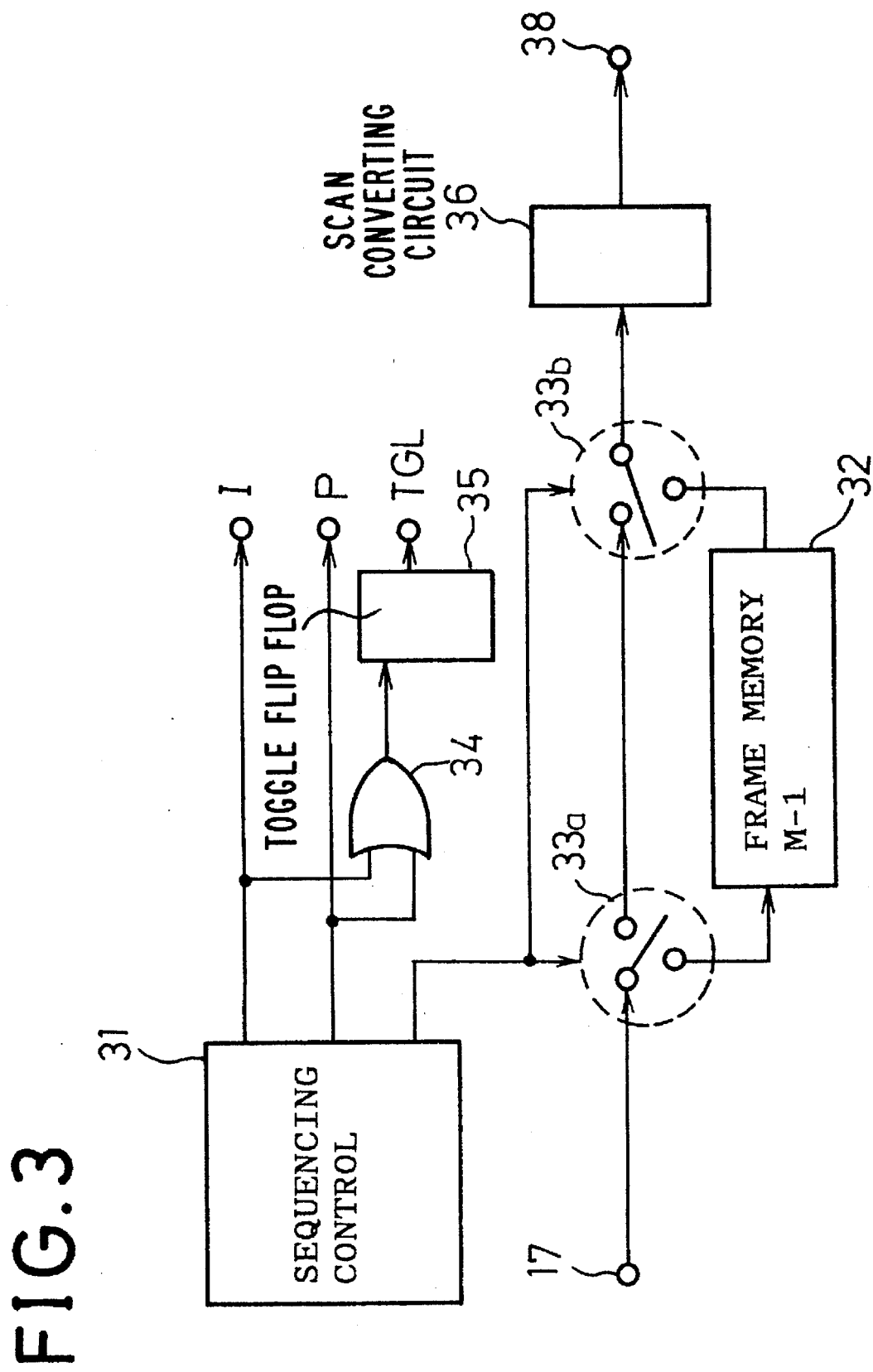
FIG. 3 is a block diagram showing detailed construction of an input frame re-arranging circuit of the coding apparatus of FIG. 1.

Referring now to FIG. 3, there is shown in more detail the configuration of the input frame re-arranging circuit 1. The input frame re-arranging circuit 1 changes the order of frames of input motion pictures so that M−1 B-picture frames are placed between I- and/or P-picture frames. The input frame re-arranging circuit 1 includes a sequence control circuit 31 for allocating an I- or P-picture after every M−1 frames of input pictures and allocating B-pictures to frames between such adjacent I- and/or P-picture frames, and the sequence control circuit 31 outputs a signal of 3 bits after each frame period. The input frame re-arranging circuit 1 further includes a frame memory 32 into which data for M−1 frames can be stored, a pair of switches 33a and 33b, an OR gate 34, a toggle flip-flop 35 which reverses contents thereof in synchronism with a frame when the output of the OR gate 34 is "1", and a scan converting circuit 36 for converting a raster scan signal into a block scan signal. The output of the sequence control circuit 31 is, when represented in binary value, "100" for an I-picture, "010" for a P-picture and "001" for a B-picture with the MSB (most significant bit) thereof provided from the top terminal in FIG. 3. By the switches 33a and 33b, an I- or P-picture of a signal of the input port 17 is outputted as it is, but a B-picture is once stored into the frame memory 32 and outputted after it is delayed by M frame periods. In the example of re-arrangement shown in FIG. 2, conversion of input frames at the uppermost stage from ( ..., $F_{-2}$, $F_{-1}$, $F_0$, $F_1$, ..., $F_6$) to ( ..., $F_{-4}$, $F_0$, $F_{-2}$, $F_{-1}$, $F_3$, $F_1$, $F_2$, $F_6$) is realized with the delay of three frame periods, that is, M=3. The thus re-arranged picture signal is subsequently converted into a block scan signal of 16 picture elements×16 lines by the scan converting circuit 36 and outputted from the output port 38. It is to be noted that the signal waveform TGL in FIG. 2 indicates an output waveform of the toggle flip-flop 35.

Referring back to FIG. 1, the input motion picture signal after re-arranged by the input picture re-arranging circuit 1 in this manner is inputted to the motion detecting circuit 4, at which coding processing is subsequently performed for each block. It is to be noted that, while coding of color motion pictures is performed by a color signal coding section provided separately or by interleaving blocks of a chrominance difference signal, the following description proceeds based on the assumption that one block includes 16×16 picture elements only of a luminance signal for the convenience of description.

First, the motion detecting circuit 4 detects a motion vector from locally decoded signals stored in the storage circuit 2, and then, the predictive signal generating circuit 5 generates an optimum predictive signal based on the detected motion vector using data of the storage circuit 2. Then, the predictive signal thus generated is inputted to the locally decoding circuit 8, and a predictive difference signal of the predictive signal from the input signal is outputted from the predictive signal generating circuit 5 to the quantizing circuit 6. The configuration and operation of the address generating circuit 3, the motion detecting circuit 4 and the predictive signal generating circuit 5 will be hereinafter described in detail. The predictive difference signal is processed for discrete cosine transform and quantization into a conversion coefficient by the quantizing circuit and is then coded into a final bit sequence together with coded mode information of the motion vector and so forth not shown by the variable length coding circuit 7, whereafter it outputted to the outside by way of the output port 18. Meanwhile, inverse operation to that of the quantizing circuit 6 is performed for the output of the quantizing circuit 6 by the locally decoding circuit 8. The locally decoding circuit 8 thus generates a locally decoded signal of an I- or P-picture from the thus obtained signal from the quantizing circuit 6 and the predictive signal inputted thereto from the predictive signal generating circuit 5 and stores the thus generated locally decoded signal into the storage circuit 2. The quantizing circuit 6, the variable length coding circuit 7 and the locally decoding circuit 8 can be constructed using an LSI already on the market for commercial use such as, for example, a chip set supplied from the GCT described hereinabove.

Figure 4:
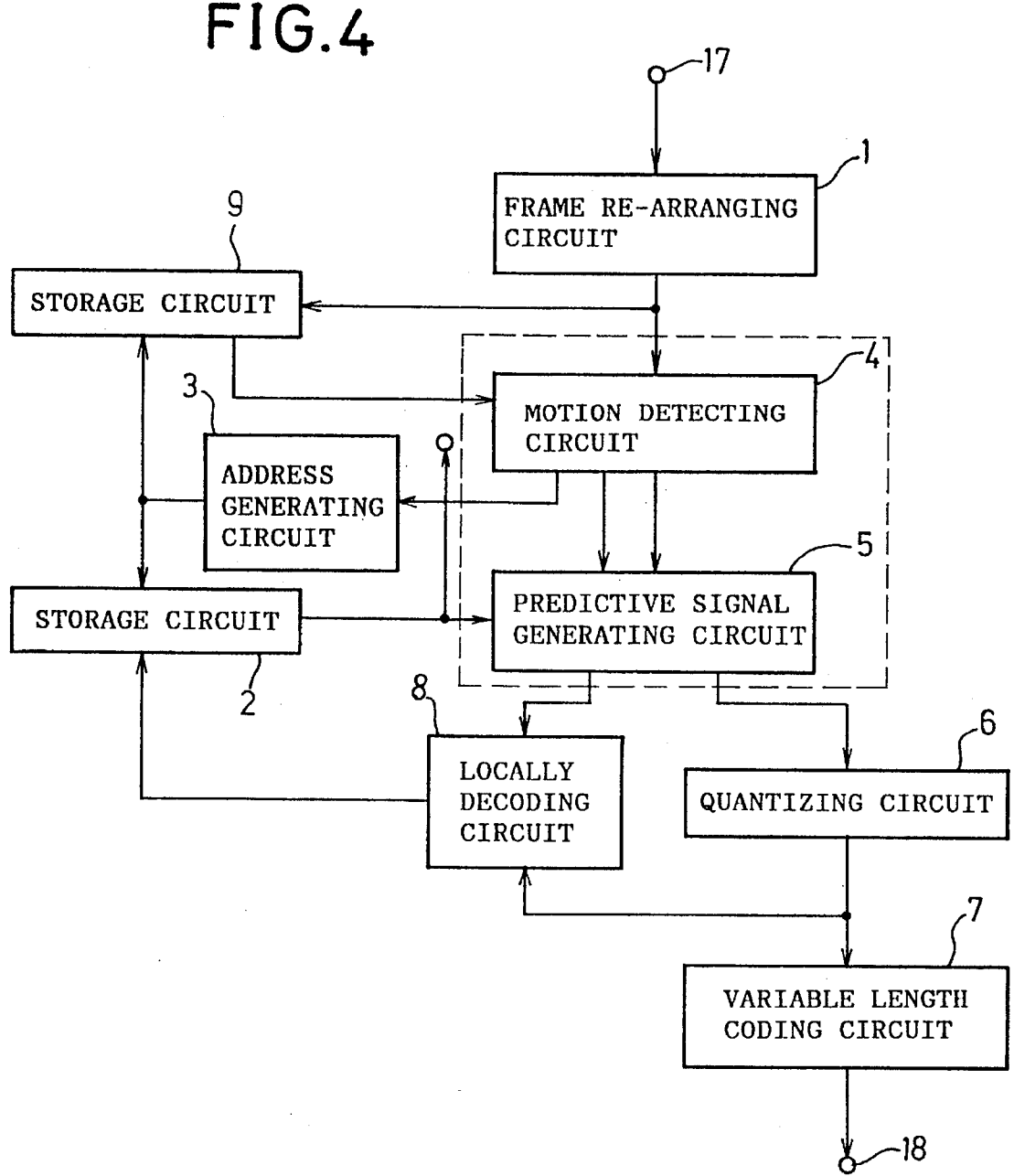
FIG. 4 is a block diagram of another coding apparatus showing a second preferred embodiment of the present invention.

Referring now to FIG. 4, there is shown a motion picture coding apparatus according to a second preferred embodiment of the present invention. The motion picture coding apparatus of the present embodiment is a modification to and has the same configuration as the motion picture coding apparatus of the preceding embodiment shown in FIG. 1 except that it additionally includes another a storage circuit 9 into which only an I- or P-picture of the output of the input picture re-arranging circuit 1 is stored. A picture signal stored in the storage circuit 9 is inputted to the motion detecting circuit 4. Meanwhile, the same address as the address supplied from the address generating circuit 3 to the storage circuit 2 is used for accessing to the storage circuit 9.

Figure 5:
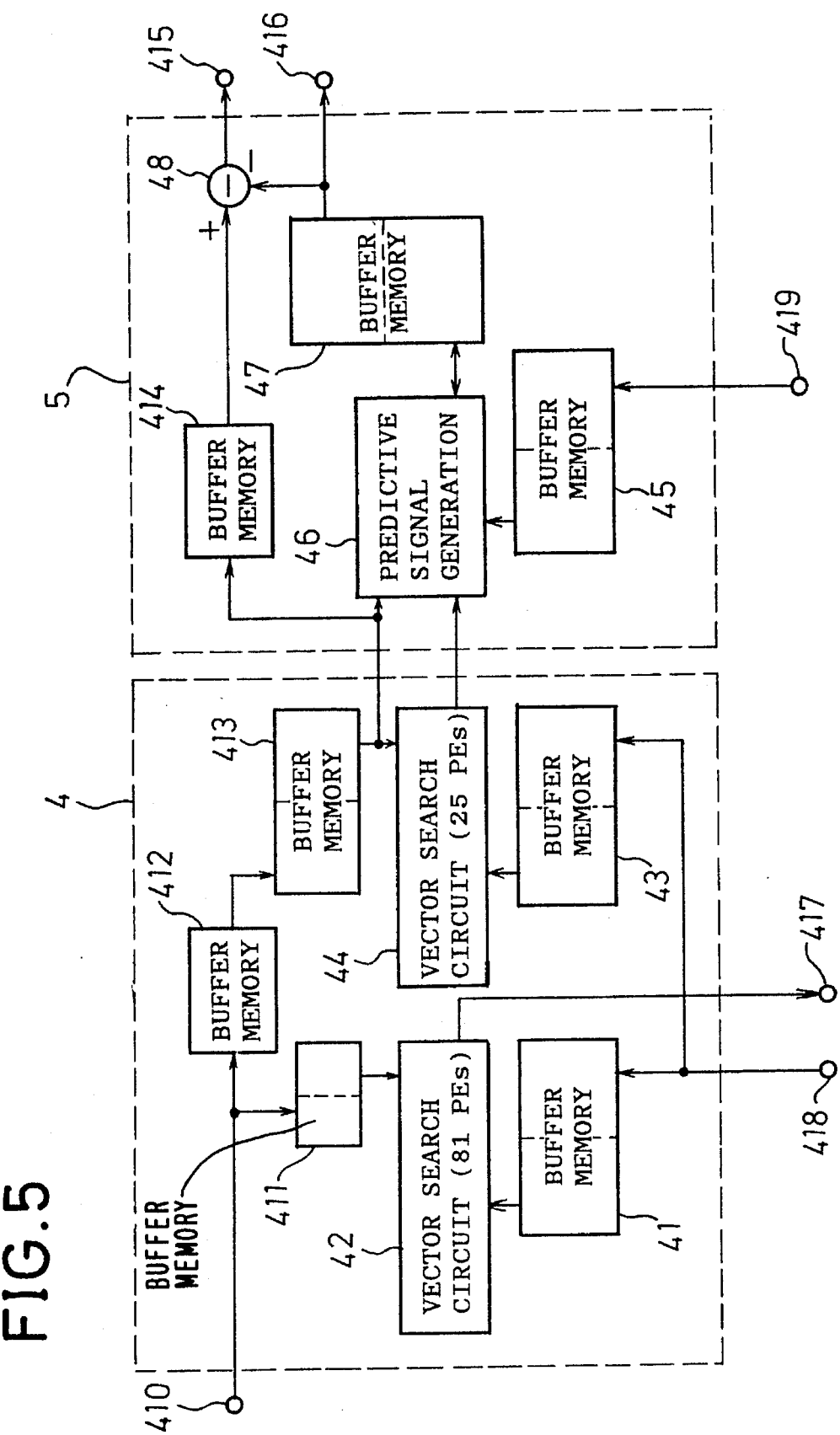
FIG. 5 is a block diagram showing detailed construction of a motion detecting circuit and a predictive signal generating circuit of the coding apparatus of FIG. 4.

Details of the motion detecting circuit 4 and the predictive signal generating circuit 5 (components within the range delineated by a dotted line in FIG. 4) are shown in FIG. 5. The motion detecting circuit 4 employs a motion vector search method which involves two-stage vector search in which it searches, at the first stage, within the range of 32 picture elements×32 lines with the accuracy of two picture elements and then performs, at the second stage, motion vector search with the accuracy of one picture element and 0.5 picture elements, to detect motion vectors with the accuracy of 0.5 picture elements within the range of ±9 data in the horizontal and vertical directions with regard to forward and backward directions. A manner of search at the first stage is illustrated in FIG. 6(a), and a manner of search at the second stage is illustrated in FIG. 6(b).

Referring to FIG. 5, the motion detecting circuit 4 has an input port 410 from the input picture re-arranging circuit 1, a motion vector output port 417 to the address generating circuit 3, and an input port 418, to which, when the configuration of FIG. 1 is employed, an output of the storage circuit 2 is supplied, but when the configuration of FIG. 4 is employed, an output of the storage circuit 9 is supplied. The motion detecting circuit 4 includes a pair of buffer memories 41 and 43 for vector search for the first and second stages, respectively, a pair of vector search circuits 42 and 44 for the first and second stages, respectively, and three buffer memories 411, 412 and 413 for an input signal from the input port 410. Meanwhile, the predictive signal generating circuit 5 has a pair of output ports 415 and 416 to the quantizing circuit 6 and the locally decoding circuit 8, respectively, and a data input port 419 from the storage circuit 2, and includes a buffer memory 45 for a locally decoded signal, a predictive signal generating unit 46 connected to the vector search circuit 44 and the buffer memory 413, a predictive signal storage buffer memory 47, a subtractor 48 for subtracting a predictive signal from an input picture signal to obtain a predictive difference signal, and a buffer memory 414 connected to the buffer memory 413.

In the first stage search, ½ subsampling is performed in the directions of columns and rows from a search window of 32 picture elements×32 columns, and 16×16 data are fetched into the search buffer 41 of FIG. 5. Meanwhile, also an input signal is subsampled for data (16×16) of one block in a grid-like pattern to obtain 8×8 data, which are stored into the buffer memory 411. The subsampling pattern then is indicated by round marks in FIG. 6(a). The vector search circuit 42 searches wlthln the range of ±4 data (corresponding to ±8 data on the original picture signal) in each of the horizontal and vertical directions. The trial vector number then is 81 with 9 vectors (±4 data) in each of the horizontal and vertical directions. Further, while search of a right adjacent block is begun after search of one block is completed at the first stage, the data which must necessarily be stored newly into the buffer memory 41 then are those within the range of 8×16 data indicated by slanting lines in FIG. 6(a) (corresponding to 16 picture elements×32 lines on the original picture signal).

The first stage motion vector search circuit 42 accumulates absolute values of differences in units of picture elements for the individual trial vectors and detects its minimum value to obtain an optimum vector. Such calculating processing can be realized, for example, using an LSI ST3220 for motion vector detection manufactured by INMOS. An outline of operation of the LSI ST3220 is described in Video Information Magazine, June 1991, pp.83–89. According to the description, in order to detect an optimum vector from within 256 trial vectors within the range of −8 to +7 picture elements and −8 to +7 lines, 256 processor elements (PEs) of the same number as the trial vector number are caused to operate in parallel. In order to realize the vector search circuit 42 of the construction, search at the first stage can be realized if only 81 processor elements of the total of 256 processor elements are used for operation.

Figure 7:
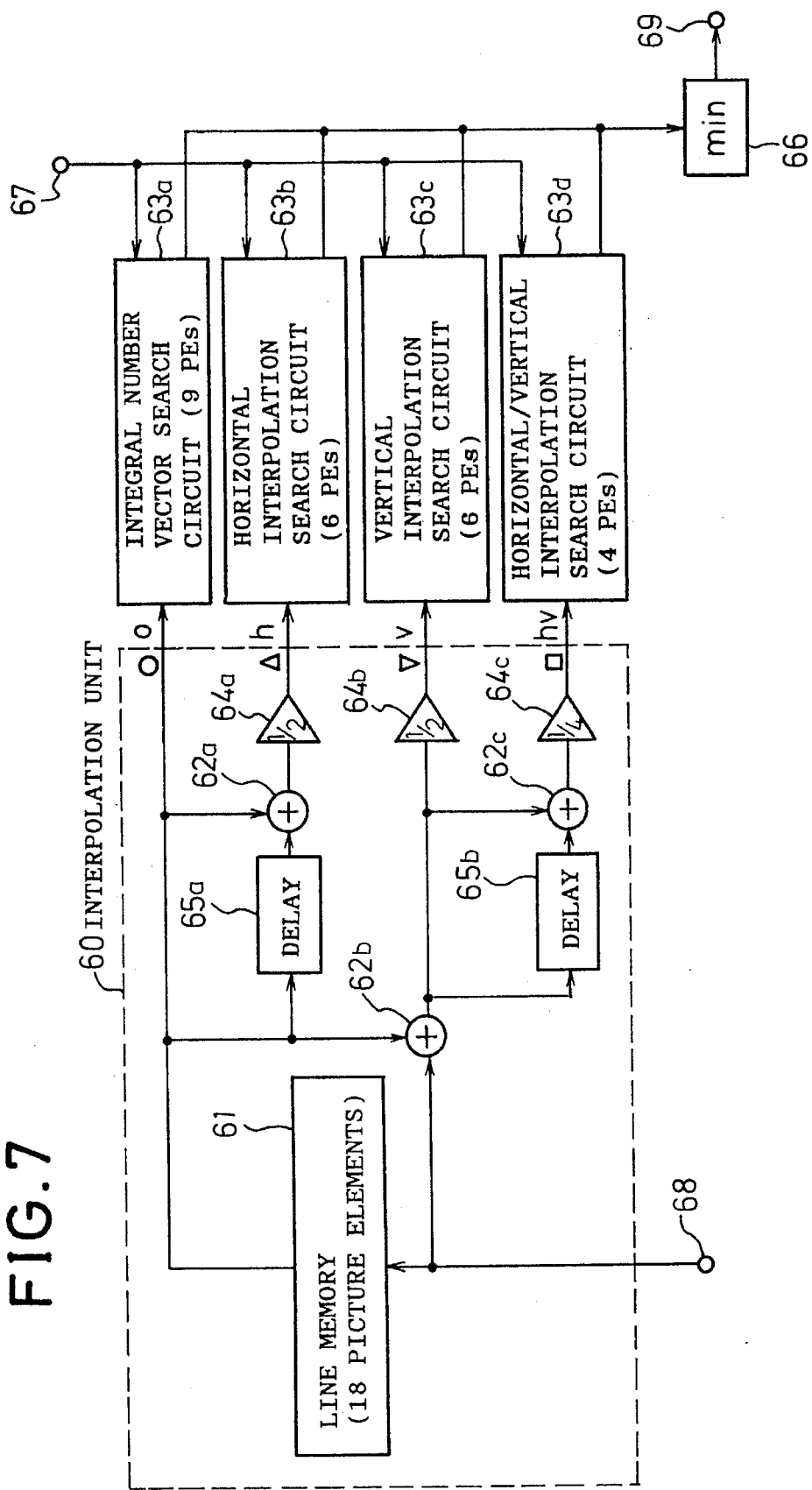
FIG. 7 is a detailed block diagram of a second stage motion vector search circuit of the coding apparatus of FIG. 4.

In the second stage search, a search window of 18 picture elements×18 lines is fetched into the buffer memory 43 without subsampling from peripheral ones of the vectors obtained at the first stage, as shown in FIG. 6(b), to detect motion vectors with the accuracy equal to or less than one picture element. Details of the second stage motion vector search circuit 44 are shown in FIG. 7. Referring to FIG. 7, the second stage motion vector search circuit 44 includes a line memory 61 for realizing a delay for one line (18 picture elements), three adders 62a, 62b and 62c, three multipliers 64a, 64b and 64c for multiplication of ½, ½ and ¼, respectively, and a pair of delay units 65a and 65b. An interpolating unit 60 is constituted from the components 61, 62a to 62c, 64a to 64c and 65a and 5b. The motion vector search circuit 44 further includes four vector circuits 63a, 63b, 63c and 63e and a minimum value detecting circuit 66, and has a pair of input ports 67 and 68 to which input block signals are supplied from the buffer memories 413 and 43, respectively, of FIG. 5 and search area data of the second stage are supplied, and an output port 69 for outputting detected motion vectors to the predictive signal generating circuit 5.

Data of 18×18 picture elements fetched into the buffer memory 43 are read out in order of block scan to the input port 68. A train of data of integral number picture elements (o), horizontal direction 0.5 picture element interpolation (h), vertical direction 0.5 picture element interpolation (v) and horizontal/vertical 0.5 picture element interpolation (hv) corresponding to the arrangement of FIG. 6(b) is outputted from the interpolating unit 60. A processor element (PE) similar to the LSI ST3220 described hereinabove is connected to each interpolation signal by a number corresponding to trial vectors. In particular, if a total of 25 processor elements including 9, 6, 6 and 4 processor elements are arranged for output ports o, h, v and hv, respectively, of the interpolation unit 60 and are caused to operate in parallel, then the motion vector detecting circuit for the second stage can be constructed. An optimum motion vector (search range of ±1 data) with the accuracy of 0.5 picture elements is determined by the minimum value detecting circuit 66 and outputted to the predictive signal generating circuit 5 by way of the output port 69 in such a manner as described above.

In the predictive signal generating circuit 5 of FIG. 5, data of 18×18 picture elements corresponding to the picture data in the buffer memory 43 are already written in the buffer memory 45 by way of the input port 419. Accordingly, in the predictive signal generating circuit 46, a predictive signal corresponding to vectors with the 0.5 picture element accuracy is generated from the locally decoded signal stored in the buffer memory 45 by processing similar to that by the interpolation unit 60 of FIG. 7. Further, the predictive signal generating circuit 46 determines an optimum predictive method between the predictive signal and the input block signal to the buffer memory 414 to find out an inter-frame predictive signal and stores it into the predictive signal storing buffer memory 47. The inter-frame predictive signal stored in the buffer memory 47 is outputted to the locally decoding circuit 8 by way of the output port 416. Meanwhile, the input signal delayed by interval of times required for vector search and predictive signal generation by the buffer memories 412, 413 and 414 is converted into a difference signal from the optimum inter-frame predictive signal stored in the buffer memory 47 by the subtractor 48 and is outputted to the quantizing circuit 6 by way of the output port 415.

Figure 8:
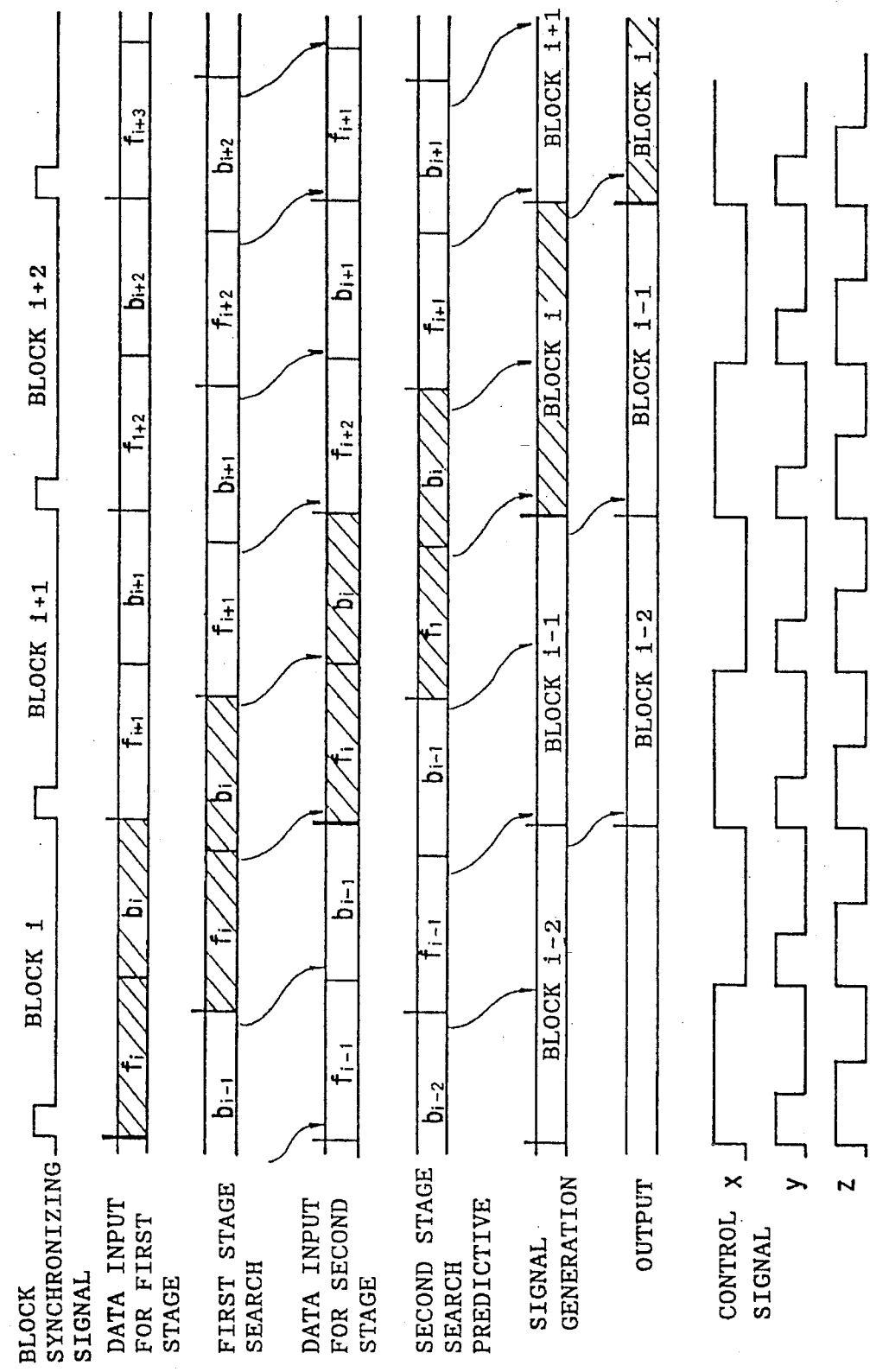
FIG. 8 is a diagram illustrating operation timings of the circuits shown in FIG. 5.

FIG. 8 shows operation timings of the circuits shown in FIG. 5. A block of 16×16 picture elements of each frame are successively processed by pipeline processing for a block period of three stages including search at the first stage, search at the second stage and generation of a predictive signal. For example, in the case of 352×240 motion pictures of 30 frames/second, real time processing is assured if the coding period of one block is within about 100 microseconds. Forward and backward vector detection is performed in a time division condition dividing one block period to one half. Further, data necessary for forward prediction are fetched in the front half of a block period and data necessary for backward prediction are fetched in the rear half of the block period so that data necessary for vector detection and predictive signal generation may be prepared in the buffer memories 41, 43 and 45 of FIG. 5. Further, the address generating circuit 3 is controlled for each of I-, P- and B-pictures by control signals x and y shown at lower stages of FIG. 8 so that data inputting and outputting timings to and from the storage circuit 2 and the storage circuit 9 are determined.

Figure 9:
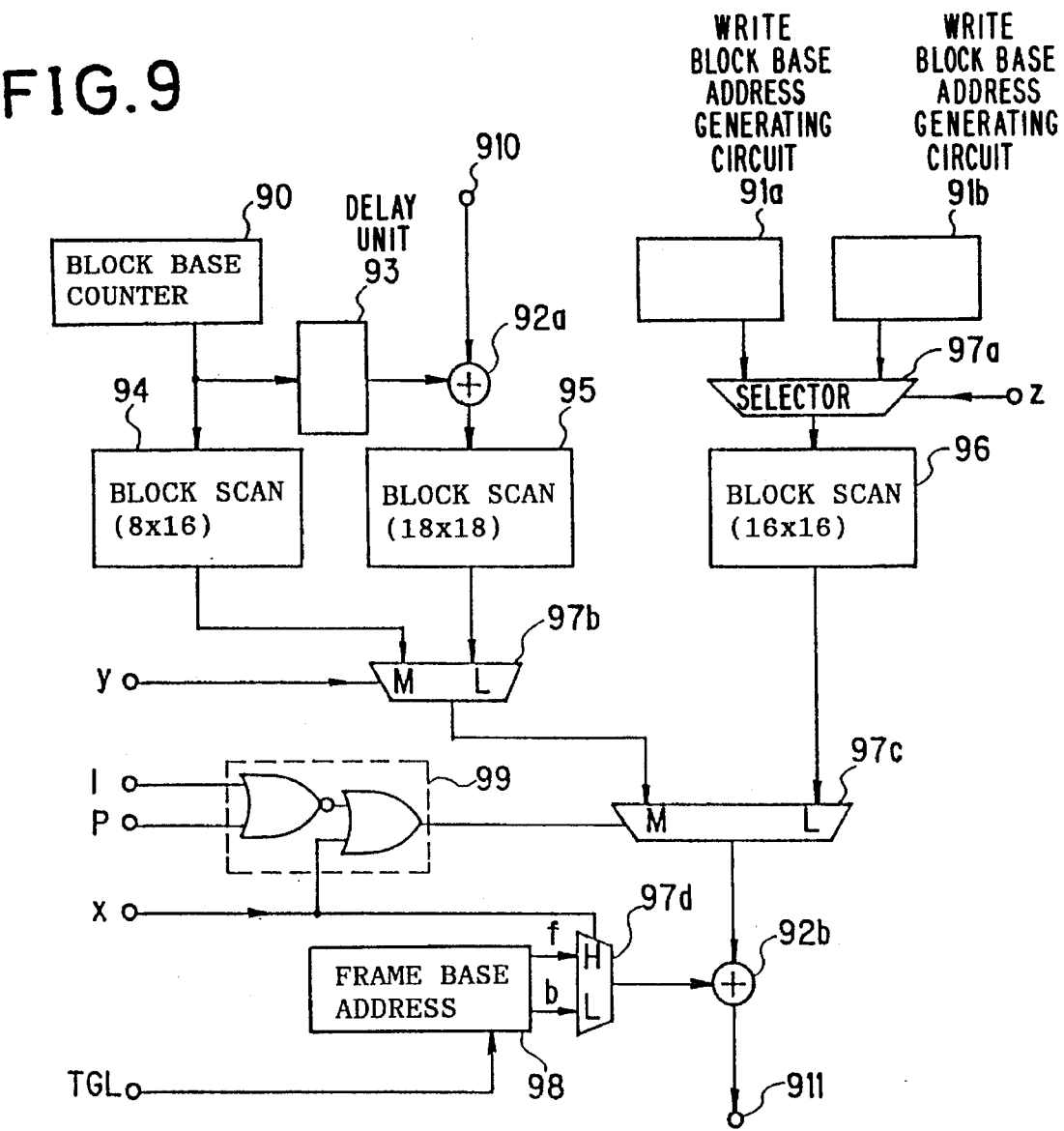
FIG. 9 is a block diagram showing detailed construction of an address generating circuit of the coding apparatus of FIG. 4.

Details of the address generating circuit 3 are shown in FIG. 9. Referring to FIG. 9, the address generating circuit 3 has an input port 910 to which a motion vector detected by the first stage vector search circuit 42 is supplied, and an output port 911 for outputting an address to the storage circuit 2 and the storage circuit 9 therefrom. The address generating circuit 3 includes a block base address generating circuit 90 for a coded block, a block base address generating circuit 91a for writing into the storage circuit 9, a block base address generating circuit 91b for writing into the storage circuit 2, a pair of address 92a and 92b, a delay unit 93 for outputting a block base address delayed by one block period, three block scan address generating circuits 94, 95 and 96, four selectors 97a, 97b, 97c and 97d, and a gate circuit 99.

The address generating circuit 3 further includes a frame base address generating circuit 98 which outputs two base addresses of a picture signal alternately to two output terminals in response to the TGL signal of FIG. 2.

The block scan address generating circuit 94 generates a read address within the range of 8×16=128 picture elements necessary for first stage motion vector search using an output of the block base counter 90, which outputs a base address of an object block for coding, as the starting point. The block scan address generating circuit 95 generates a read address within the range of 18×18=324 picture elements for second stage vector search based on the motion vector information obtained in the preceding block period. Meanwhile, the block scan address generating circuit 96 generates a write address within the range of 16×16=256 picture elements for writing of data into the storage circuit 9 and the storage circuit 2. Those addresses are outputted in a time division multiplexed condition in a time slot which depends upon a combination of the control signals x, y and z shown at the lower stage of FIG. 8 and I, P and B identification signals generated by the sequence control circuit 31 (FIG. 3).

While a B-picture is coded, an output of the selector 97b is selected as the output of the selector 97c irrespective of the control signal x. The selector 97b selects a data read address for first stage vector search when the control signal y is at a high level, but selects a data read address for second stage vector search when the control signal y is at a low level.

The selector 97c selects an output of the block scan address generating circuit 96 in the rear half of a block period while an I- or P-picture is coded. The selector 97a selects an output of the write block base address generating circuit 91a for the storage circuit 9 to the block scan address generating circuit 96 when the control signal z is at a high level, but selects an output of the write block base address generating circuit 91b for the storage circuit 2 to the block scan address generating circuit 96 when the control signal z is at a low level. In this manner, the period between P- and/or an I-pictures is used for writing of data into a search memory in the rear half of a block period.

Memory access interleaves for each block period are collectively shown in FIGS. 10(a) and 10(b). FIG. 10(a) illustrates time slot allocation when the configuration of FIG. 1 is employed, and FIG. 10(b) illustrates time slot allocation when the configuration of FIG. 4 is employed. In the time slot allocations, it is shown that one cycle is required to write or read out data of one picture element. Referring to FIGS. 10(a) and 10(b), reference characters r1f and r1b denote read-out of data necessary for first stage vector search, r2f and r2b denote read-out of data necessary for second stage vector search, reference character w2 denotes writing of data into the storage circuit 2, and w9 writing of data into the storage circuit 9.

An access frequency will be examined with reference to FIG. 10(b). First, in the case of an I-picture, the access frequency is only 256 cycles×2= 512 cycles for writing (w2, w9) since no inter-frame prediction is performed. In the case of a P-picture, the access frequency is a total of 964 cycles of 128+ 324= 452 cycles for forward prediction (r1f, r2f) and 512 cycles for writing (w2, w9). In the case of a B-picture, the access frequency is 452 cycles×2=904 cycles for both of forward prediction (r1f, r2f) and backward prediction (r1b, r2b).

Here, since one block includes 16×16= 256 picture elements, memory access of 256 cycles per block period corresponds to the signal rate of the input video signal. From FIGS. 10(a) and 10(b), it can be seen that, since the access frequency is lower than 1,024 cycles per block period with any of I-, P- and B-pictures, with the circuit configuration of the present embodiment, the access to the storage circuits 2 and 9 remains within four times that of the original signal.

The motion picture coding apparatus according to the first and second embodiments of the present invention have been described and the accessing method to the storage circuit 2 and the storage circuit 9 necessary for motion vector search and predictive signal generation has been explained so far.

It is to be noted that it is publicly known that a low-pass filter is provided at a stage preceding to subsampling in order to achieve enhancement of the accuracy in vector search by subsampling. In the present invention, a low pass filter is applied to writing into the storage circuit 9 or the storage circuit 2 to which the motion vector detecting circuit refers so as to effect subsampling to ¼. In this instance, the access to the storage circuits increases by ¼=0.25 times that of the original signal. Also in this instance, it can be seen that all access is realized in the access frequency which is equal to four times the original signal rate or so as a whole.

Further, while, in the embodiment shown in FIG. 4, the storage circuit 2 and the storage circuit 9 are formed as separate memories, if a high speed memory chip is adopted, then contents of the storage circuit 2 and the storage circuit 9 can be mapped in separate address spaces in the single storage circuit.

Generally, in a motion vector search method, when pattern matching using only even-numbered (or odd-numbered) picture elements is premised, only data at even-numbered (or odd-numbered) addresses both in the horizontal and vertical directions make an object for calculation so far as the motion vectors to be detected are the even-numbered (or odd-numbered) picture elements. Accordingly, even three-stage (K=3) motion vector search wherein motion vector search is performed with the accuracy of four picture elements at the first stage, with the accuracy of two picture element at the second stage and with the accuracy of 0.5 picture elements at the third stage can be realized by the buffer memory configuration of FIG. 5 and the memory access system shown in FIGS. 9 and 10. In particular, search at the first to the K−1th stages can be realized using contents of the buffer memory 41 if only the first stage vector search circuit 42 is modified. In this instance, the memory access necessary for transmission of data to the buffer memory 41 and the capacity of the buffer memory 41 are reduced to one fourth that of the case wherein search in the same search range is performed with the accuracy of one picture element.

Figure 11:
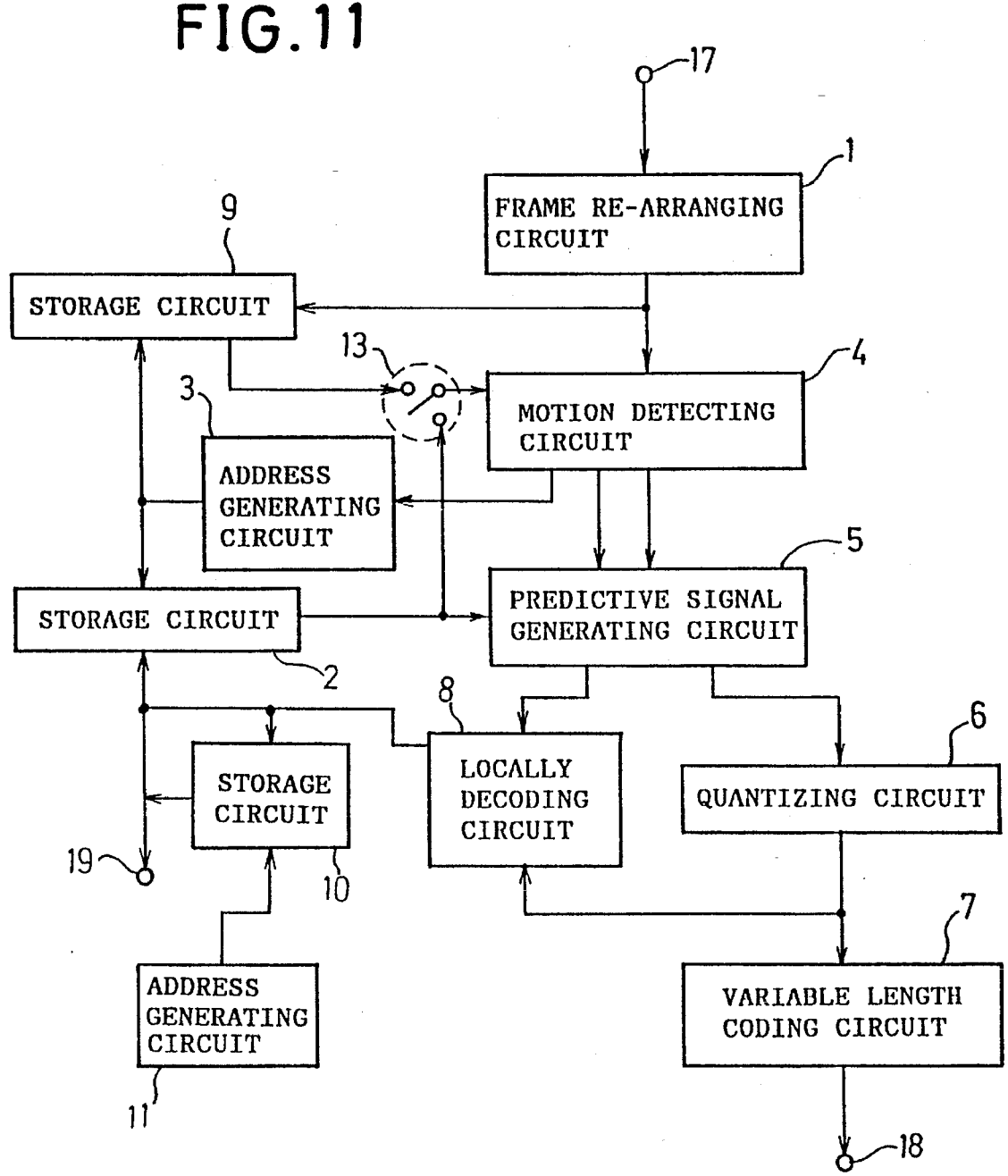
FIG. 11 is a block diagram of a further coding apparatus showing a third preferred embodiment of the present invention.

Referring now to FIG. 11, there is shown a motion picture coding apparatus according to a third preferred embodiment of the present invention. The motion picture coding apparatus of the present embodiment performs coding processing on the real time basis and simultaneously outputs a locally decoded signal to a monitor screen to provide supervising means for a compressed coded picture. The motion picture coding apparatus is a modification to and different from the motion picture coding apparatus of the second embodiment shown in FIG. 4 in that it additionally has a monitor/ reproduction signal output port 19 and additionally includes a monitoring/reproducing storage circuit 10, an address generating circuit 11, and a switch 13. In the present motion picture coding apparatus, the motion vector detecting circuit 4 can selectively use, for vector search, an input signal stored in the storage circuit 9 and a locally decoded signal stored in the storage circuit 2.

In the motion picture coding apparatus of the present embodiment, the locally decoding circuit 8 generates locally a decoded signal not only of an I- or P-pictures but also of a B-picture. While a locally decoded I- or P-picture is stored into the storage circuit 2 similarly as in the motion picture coding apparatus of the first and second embodiments described hereinabove, it is simultaneously stored also into the storage circuit 10. The locally decoded signal of an I- or P-picture written in the storage circuit 10 is outputted at a delayed timing shown at a lower stage of FIG. 2 so that the order of frames thereof is put back into that of the reproduced signal and the locally decoded signal of the order is outputted to the output port 19.

Since the locally decoding circuit 8 outputs a decoded signal for each block period, when a B-picture is to be outputted from the locally decoding circuit 8 directly to the output port 19, the scanning order in a frame is that of block scanning of 16×16. In order to make this compatible with an external image monitoring circuit or the like, read-out from the storage circuit 10 is performed in order of raster scanning. As regards an I- or P-picture, since it is stored once into the storage circuit 10, such read-out can be realized by generation of a read address, but scan change for a B-picture must be assured newly in the storage circuit 10. Operation of the address generating circuit 11 necessary for such frame order change or intra-frame scan change will be hereinafter described.

Figure 12:
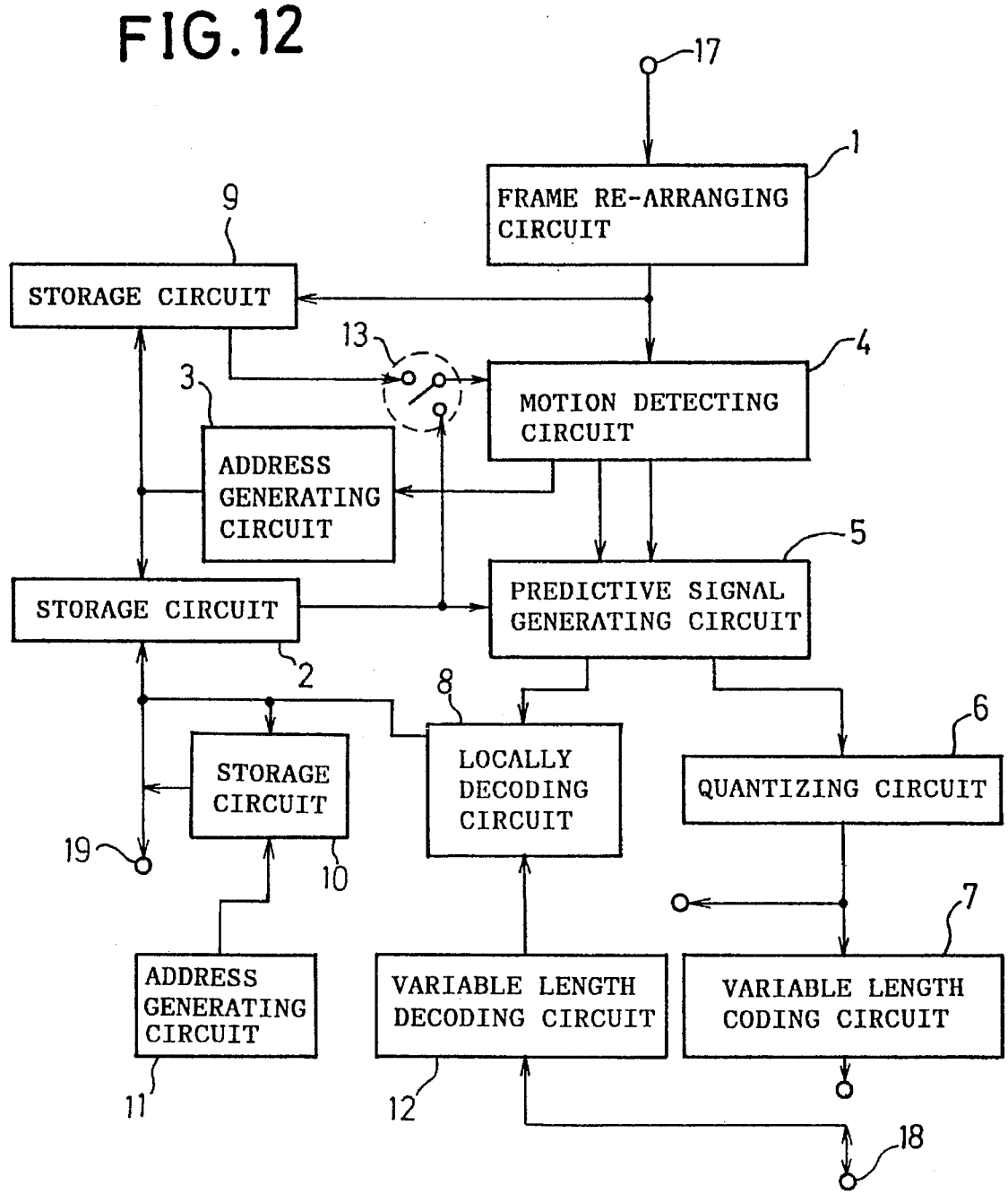
FIG. 12 is a similar view but showing a fourth preferred embodiment of the present invention.

Referring now to FIG. 12, there is shown a motion picture coding apparatus according to a fourth preferred embodiment of the present invention. The present embodiment provides means for reproducing an already coded bit sequence to confirm a coded picture or for searching an editing point during edition. The motion picture coding apparatus of the present embodiment is a modification to and different from the motion picture coding apparatus of FIG. 11 in that it additionally includes a variable length decoding circuit 12. During reproduction, those functions of the motion picture coding apparatus of the present embodiment which are necessary for coding, that is, the input picture re-arranging circuit 1, the motion detecting circuit 4, the predictive signal generating circuit 5, the quantizing circuit 6 and the variable length coding circuit 7, stop their operation.

The variable length decoding circuit 12 codes, by variable length coding, a coded bit sequence supplied from the outside to the bit sequence input/output port 18. Motion vectors reproduced by the variable length decoding circuit 12 are outputted to the address generating circuit 11. Signals read out from the variable length decoding circuit 12 and the storage circuit 10 by the address generating circuit 11 are inputted to the locally decoding circuit 8. Here, the variable length decoding circuit 12 can be realized with such an LSI as in the chip set described on the pages of the prior art.

The locally decoding circuit 8 reproduces a predictive signal from a decoded picture read out from the storage circuit 10 to obtain a reproduced signal by frame adding processing to a predictive error signal inputted from the variable length decoding circuit 12. In this instance, the predictive signal for which motion vectors with the accuracy of 0.5 picture elements are used must necessarily be reproduced by calculation in the locally decoding circuit 8 from the range of 17×17 data for each of forward and backward directions. An I- or P-picture reproduced by the locally decoding circuit 8 is stored into the storage circuit 10 and is used for generation of an inter-frame predictive signal of a P-picture and a B-picture which is decoded later. The method of outputting a reproduced signal from the output port 19 is the same as that for a monitor output of the motion picture coding apparatus of the third embodiment described above.

Figure 13:
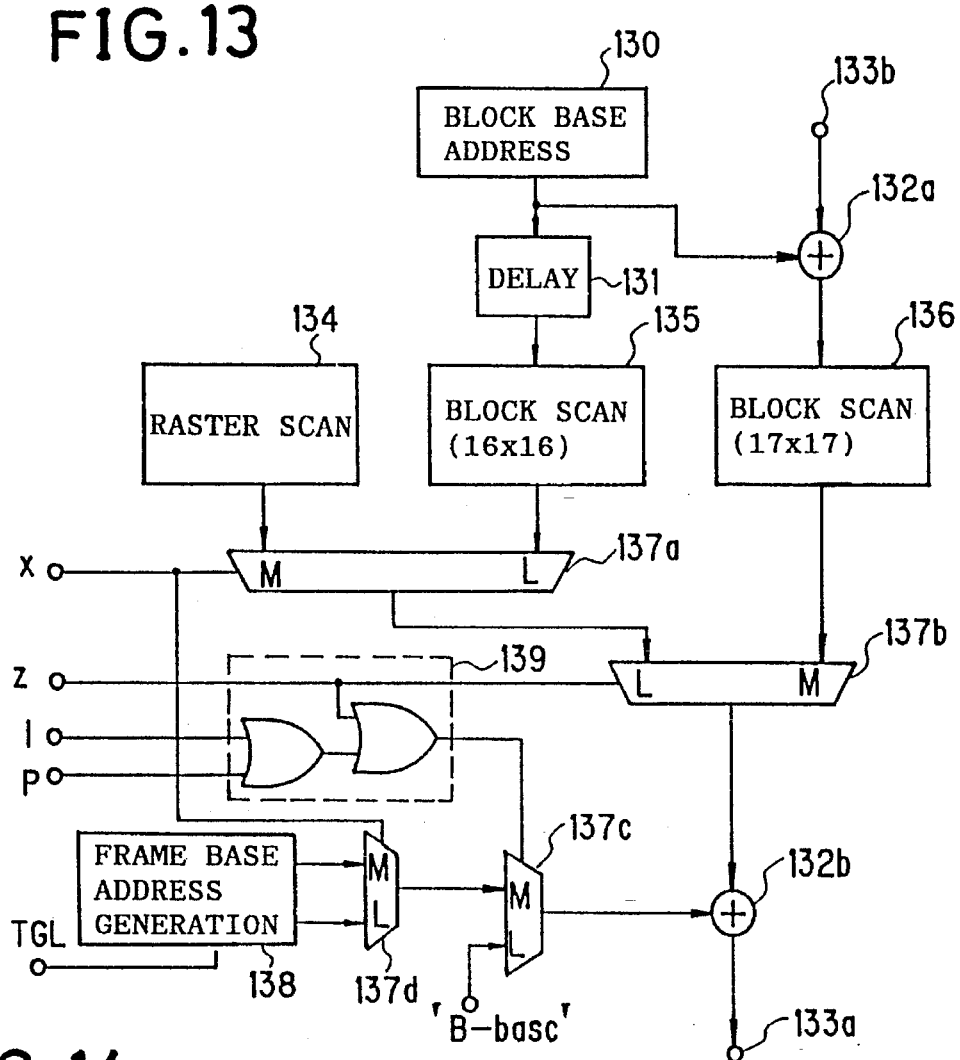
FIG. 13 is a block diagram showing detailed construction of an address generating circuit of the coding apparatus of FIGS. 11 and 12.

Details of the address generating circuit 11 which is used commonly with the motion picture coding apparatus of the third and fourth embodiments of the present invention are shown in FIG. 13.

Referring to FIG. 13, the address generating circuit 11 has an address output port 133a, and an input port 133b to which, only upon when the construction of FIG. 12 is employed, an integral number portion of a motion vector decoded by the variable length decoding circuit 12 is inputted. The address generating circuit 11 includes a block base address generating circuit 130 for outputting a base address of a block to be decoded by the locally decoding circuit 8, a delay unit 131 for delaying the block base address, a pair of adders 132a and 132b, a read-out raster scan address generating circuit 134, a write block scan address generating circuit 135, a decoding block scan address generating circuit 136 for generating a block scan address of 17×17 data, four selectors 137a, 137b, 137c and 137d, a frame base address generating circuit 138, a gate circuit 139, and an address output port 133a. The frame base address generating circuit 138 outputs two base addresses for a picture signal alternately to two output terminals in response to the TGL signal of FIG. 2.

The write block scan address generating circuit 135 generates a decoded signal write address using an address of an output of the block base counter 130, which is delayed by a reproduction processing delay amount (one block period) by the locally decoding circuit 8, as the starting point. Further, the read-out raster scan address generating circuit 134 generates an address of data to be read out from the storage circuit 10 to the output port 19.

Meanwhile, the decoding block scan address generating circuit 136 is used only when a reproduced signal is to be obtained from a bit sequence. The decoding block scan address generating circuit 136 generates an address to read out the range of 17×17 data necessary for reproduction of a predictive signal using an address, which is obtained by addition by the adder 132a of an integral number portion of a decoded motion vector inputted from the input port 133a to an output of the block base counter 130, as the starting point.

The selector 137a selects, in response to a control signal x, an output of the read-out raster scan address generating circuit 134 in the former half of a block period but selects a write address generated by the block scan address generating circuit 135 in the latter half of the block period. Meanwhile, the selector 137b selects an output of the block scan address generating circuit 136 when a control signal z is at a high level, but selects an output of the selector 137a when the control signal z is at a low level. In this manner, outputs of the three kinds of address generating circuits are interleaved for a block period and outputted to the output of the selector 137b. Further, an appropriate frame base address is selected by the selectors 137c and 137d under the control of the TGL signal and the gate circuit 139 and is converted into an actual address on a memory by the adder 132b. For example, when a B-picture is to be decoded, only while the z signal remains at a low level, a base address "B-base" of a scan change region of a B-picture is selected by the selector 137c. In any other case, a frame base address for forward prediction and another frame base address for backward prediction are switched in the former half and the latter half of a block period by the selector 137d and supplied to the adder 132b.

Figure 14:
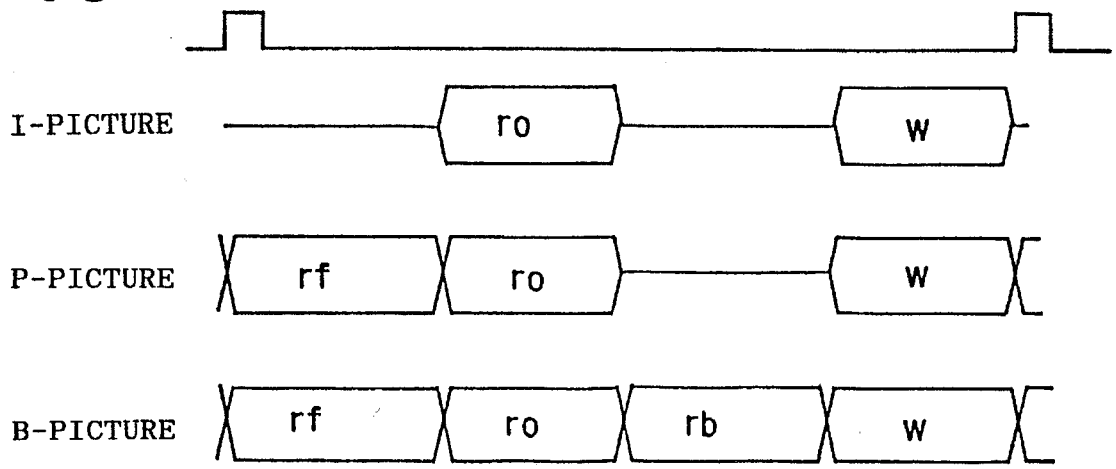
FIG. 14 is a diagram illustrating operation timings of the address generating circuit shown in FIG. 13.

Time slot allocation of an output address of the address generating circuit 11 within a block period is shown in FIG. 14. Here, a time slot used upon reproduction is shown. As shown in FIG. 14, three kinds of memory access are interleaved in the block period and outputted to the storage circuit 10. Here, reference character ro denotes read-out of data to the output port 19, reference characters rf and rb denote read-out of data to the locally decoding circuit 8 necessary upon reproduction, and reference character w denotes write of data into the storage circuit 10.

In the case of an I-picture, since no read-out for decoding is required, only a total of 512 cycles for writing (w) and read-out (ro) are required. In the case of a P-picture, a total of 801 cycles including 17×17=289 cycles necessary for generation of a predictive signal (rf) and 512 cycles for monitoring input/output (ro, w) are required. In the case of a B-picture, a total of 1,090 cycles including 289×2 cycles for forward and backward prediction (rf, rb) and 512 cycles for monitoring input/output (ro, w) are required.

Accordingly, the access frequency to the storage circuit 10 is 1,090/256=4.26 times that of the original signal. It is to be noted that, when scanning change is not performed, the access frequency in the case of a B-picture is reduced to 289×2=578, and accordingly, 801 cycles of a P-picture make a maximum access frequency to the storage circuit 10 and the access frequency may be 801/256=3.13 times that of the original signal.

As described so far, according to the motion picture coding apparatus of the embodiments of the present invention, it has been proved that, in either of a case wherein an input signal is used and another case wherein a locally decoded signal is used for detection of a motion vector, or even when monitoring of a coded picture or reproduction from a bit sequence is performed, motion vector detection can be realized within the memory access range to each storage circuit which is, to the utmost, four times or more the original picture signal rate.

Having now fully described the invention, it will be apparent to one of ordinary skill in the art that many changes and modifications can be made thereto without departing from the spirit and scope of the invention as set forth herein.

What is claimed is:

1. A motion picture coding apparatus for coding pictures of an input motion picture signal as inter-frame predictive pictures of an intra-coded picture and a predictive coded picture, comprising:

input picture rearranging means for changing an order of picture frames of said input motion picture signal based on inter-frame prediction;

a first storage circuit for storing intra-coded pictures and decoded pictures of said intra-coded pictures;

first motion vector detecting means for detecting motion vectors in units of even numbered picture elements from correlations between picture elements sampled in a vertical direction and a horizontal direction from the motion picture signal rearranged by said input picture rearranging means and picture elements sampled in the vertical direction and the horizontal direction from said input motion picture signal;

a second storage circuit for storing intra-coded pictures and predictive coded pictures of the motion picture signal rearranged by said input picture rearranging means;

second motion vector detecting means for interpolating 0.5 picture elements in said input motion picture signal and detecting motion vectors within an accuracy of 0.5 picture elements from correlations of the picture elements into which the 0.5 picture elements have been interpolated to the intra-coded pictures and the predictive coded pictures stored in said second storage circuit;

address generating means for controlling inputting and outputting operations of said first and second storage circuits in response to an output of said first motion vector detecting means;

predictive signal generating means for generating an inter-frame predictive signal from decoded pictures outputted from said first storage circuit and an output of said second motion vector detecting means and outputting a prediction difference signal representative of a difference between said inter-frame predictive signal and an output of said input picture rearranging means;

quantizing means for quantizing said prediction difference signal;

variable length coding means for variable length coding an output of said quantizing means; and local decoding means for receiving an output of said quantizing means and said inter-frame predictive signal and producing decoded pictures of the intra-coded pictures and the predictive coded pictures.

* * * * *